US012755313B2

(12) United States Patent
Scheibelhut et al.

(10) Patent No.: US 12,755,313 B2
(45) Date of Patent: Oct. 6, 2026

(54) USING A TRAINED MACHINE-LEARNING MODEL TO FACILITATE PICKING ITEMS IN A WAREHOUSE

(71) Applicant: Maplebear Inc., San Francisco, CA (US)

(72) Inventors: Brent Scheibelhut, Toronto (CA); Charles Wesley, San Diego, CA (US); Naval Shah, Toronto (CA); Madeline Mesard, New York, NY (US)

(73) Assignee: Maplebear Inc., San Francisco, CA (US)

( * ) Notice: Subject to any disclaimer, the term of this patent is extended or adjusted under 35 U.S.C. 154(b) by 195 days.

(21) Appl. No.: 18/762,323

(22) Filed: Jul. 2, 2024

(65) Prior Publication Data

US 2026/0010939 A1 Jan. 8, 2026

(51) Int. Cl.

| | |
|---|---|
| ***G06Q 30/00*** | (2023.01) |
| ***G06Q 10/087*** | (2023.01) |
| ***G06Q 30/02*** | (2023.01) |
| ***G06Q 30/0601*** | (2023.01) |
| ***G06V 10/77*** | (2022.01) |

(52) U.S. Cl.

CPC ....... *G06Q 30/0639* (2013.01); *G06Q 10/087* (2013.01); *G06Q 30/0281* (2013.01); *G06Q 30/0635* (2013.01); *G06V 10/77* (2022.01)

(58) Field of Classification Search

CPC .................................................. G06Q 30/0639

See application file for complete search history.

(56) References Cited

U.S. PATENT DOCUMENTS

| | | | | |
|---|---|---|---|---|
| 2016/0042315 A1* | 2/2016 | Field-Darragh | ......... | H04B 5/77 705/28 |
| 2023/0113122 A1* | 4/2023 | Rao | ........................ | G06Q 10/08 706/11 |
| 2024/0242174 A1* | 7/2024 | Stanke | ............. | G06Q 10/06311 |

OTHER PUBLICATIONS

Udhaykumar, Sadhasivam, et al. “Design and development of an automated product retrieval system for a warehouse.” Sustainable Digital Technologies for Smart Cities. CRC Press, 2023. 13-32.*

* cited by examiner

*Primary Examiner* — Kathleen Palavecino

(74) *Attorney, Agent, or Firm* — Fenwick & West LLP

(57) ABSTRACT

An online system uses a trained machine-learning model to predict hard-to-find items, which may facilitate picking of these items. The online system receives, from one or more devices of one or more pickers, a device of a source, one or more devices associated with one or more users, and/or a computing system associated with a physical receptacle utilized by at least one user for shopping in a location of the source, data with information about an item. The online system applies the trained machine-learning model to output, based on the received data, a findability score for the item indicative of a findability of the item. Based on the findability score, the online system generates and communicates one or more action signals to a device of a picker, the device of the source, and/or a device associated with a user prompting one or more actions in relation to the item.

20 Claims, 5 Drawing Sheets

Smart Shopping Cart
150

USING A TRAINED MACHINE-LEARNING MODEL TO FACILITATE PICKING ITEMS IN A WAREHOUSE

BACKGROUND

Certain items can be difficult to find in warehouses, such as grocery stores, even when they are in stock. People who are shopping in a store may have to spend extra time locating a difficult-to-find item that they want. In some cases, this difficulty causes them to give up on looking for the item, resulting in lost sales. Similarly, a picker associated with an online system that fulfills an online order would spend precious time looking for an item that an online user has asked for, only to not locate the requested item and potentially having the user gets a second-choice replacement item that the picker selected—or worse, no item at all. This can cause the online system to lose out on a gross transaction value (GTV), but also have the user lose out on the item they needed and have their satisfaction suffer. Therefore, it is desirable to automatically and at a large scale identify these “hard-to-find” items to improve efficiency and avoid mistakenly trying to replace an item that is incorrectly determined to be “out of stock.”

SUMMARY

Embodiments of the present disclosure are directed to using a trained machine-learning model of an online system to predict hard-to-find items and facilitate this prediction to improve the findability of these items at a specific location of a source or across different locations of the source, i.e., to facilitate picking items in a warehouse.

In accordance with one or more aspects of the disclosure, the online system receives, via a network from at least one of one or more devices of one or more pickers associated with the online system, a device of a source associated with the online system, one or more devices associated with one or more users of the online system, or a computing system associated with a physical receptacle utilized by at least one user of the online system for shopping at a location of the source, data with information about an item. The online system accesses a findability prediction machine-learning model of the online system, wherein the findability prediction machine-learning model is trained to predict a findability of the item representing a likelihood of not finding the item given that the item is actually available. The online system applies the findability prediction machine-learning model to output, based at least in part on the received data, a findability score for the item that is indicative of the findability of the item. The online system generates, based on the findability score, one or more action signals for triggering one or more automated actions to enhance the findability of the item. The online system communicates, via the network, the one or more action signals to at least one of a device of a picker associated with the online system, the device of the source, or a device associated with a user of the online system, the one or more action signals further prompting one or more actions by at least one of the picker, the source, or the user in relation to the item.

DETAILED DESCRIPTION

Figure 1:
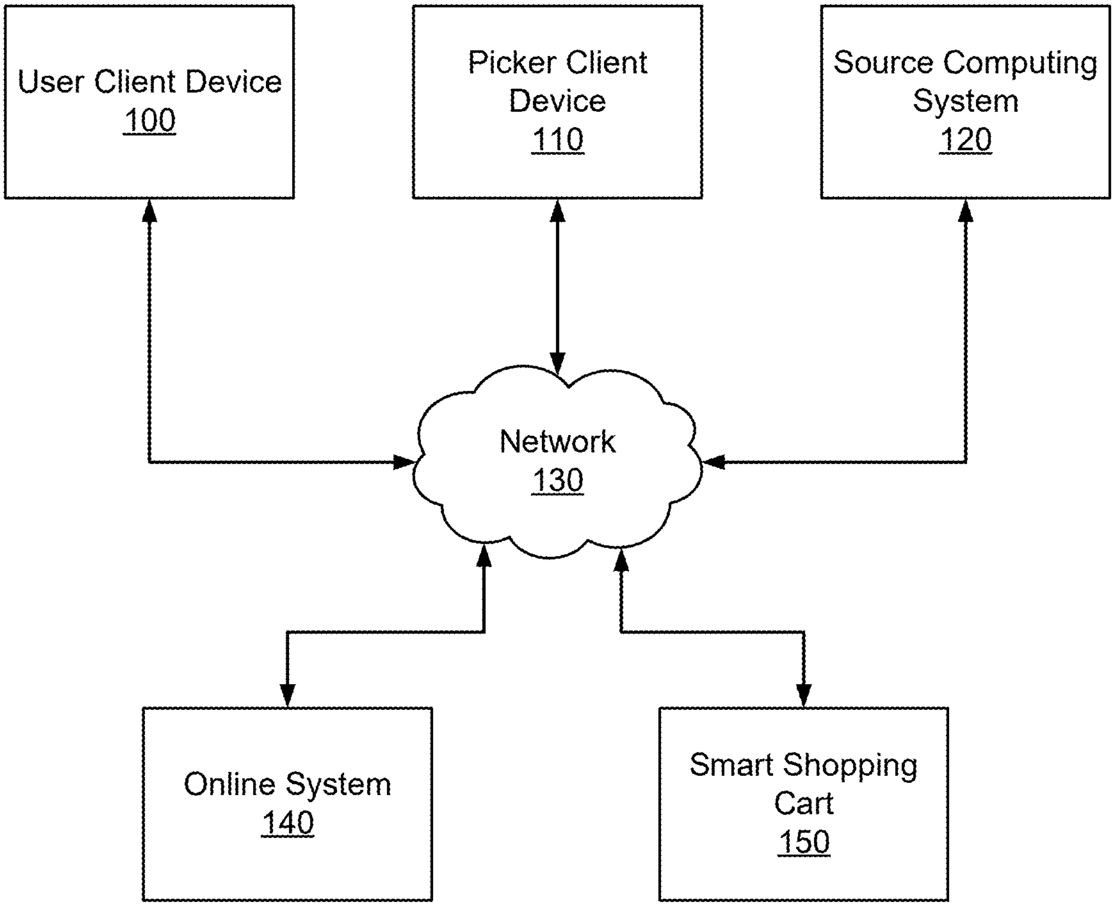
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, an online system 140, and a smart shopping cart 150. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An “item,” as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an “ordering list.” An “ordering list,” as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with the smart shopping cart 150 being used by a user to collect items in a source location. For example, the smart shopping cart 150 may display content received from the online system 140 and may receive data describing items that are collected by the user and stored in a storage area of the shopping cart. In some embodiments, the smart shopping cart 150 is a picker client device 110 being operated by a picker collecting items within a source location. Similarly, the smart shopping cart 150 may be operated by a user within the source location collecting items for themselves. Example embodiments of smart shopping carts 150 are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user's client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140.

The online system 140 dispatches pickers to source locations to pick items for fulfilling orders from users of the online system 140. Some items in a source location are more difficult to find than other items, and those items are more likely to be marked incorrectly as being out-of-stock. To avoid this type of error, the online system 140 trains a model (e.g., machine-learning model) to predict, based on a variety of inputs, findability scores for items in a particular source location or across multiple source locations. A findability score for an item may be a value (e.g., between 0 and 1) that is indicative of how easy it is to find that item in a particular source location or across multiple source locations. The higher the findability score is, the easier it may be to find the item; and the lower the findability score is, the harder it may be to find the item. The findability score may be a source location dependent variable. Alternatively, the findability score may have the same value across different source locations, especially when these source locations have similar layouts in relation to a corresponding item.

The model may be trained based on information tracked by the online system 140 during fulfillment of previous orders. The online system 140 then uses the predicted findability scores, e.g., to incentivize pickers to look harder for items that feature low findability scores before marking those items as being out-of-stock. Additionally or alternatively, the online system 140 may communicate the predicted findability scores to the source computing system 120 via the network 130 to help a source associated with the online system 140 identify problems with the layout of source location. In general, the findability scores predicted by the trained model may be leveraged to improve the found rates of those hard-to-find items.

In one or more embodiments, the online system 140 presented herein trains the model to determine which items are typically difficult to find across different source locations, but also which items are typically difficult to find at a particular source location. The online system 140 may utilize outputs of the trained model to determine how to batch orders with pickers (as some pickers are better at finding these hard-to-find items), how to provide incentives to pickers to find the hard-to-find items, how to provide insights to the source (e.g., by providing a report of the most difficult to find items in source locations, along with where users are currently expecting to find these items), and/or to generate other insights, which can ultimately lead to improved findability for items. The improved findability for items may then increase GTV for sources, decrease picker labor costs, and increase user satisfaction. The online system 140 is described in further detail below with regards to FIG. 2.

The smart shopping cart 150 is an in-store shopping cart that enables a user of the online system 140 to physically add (i.e., place) items from a source location (e.g., store) into the smart shopping cart 150 and check the items out from the source location without an involvement of an employee of the source at the point of sale. The smart shopping cart 150 may be connected to the online system 140 via the network 130. During the user's shopping session, the smart shopping cart 150 may utilize various sensors (e.g., one or more weight sensors, one or more cameras, etc.) to gather data about the user's activity, including, but not limited to, a location of the smart shopping cart 150 in the source location, weight changes of the smart shopping cart 150 as items are added to or removed from the smart shopping cart 150, video of the user's activity in and around the smart shopping cart 150, images of items added to the smart shopping cart 150, video and/or images of shelfs with items in the source location, etc. In one or more embodiments, the smart shopping cart 150 is considered being a part of the online system 140. It should be noted that the concepts described herein in relation to the smart shopping cart 150 can be extended and/or applied to other form factors, such as a handheld shopping basket, a handheld receptacle, or some other handheld object that can be used to receive and store shopping items. The smart shopping cart 150 is described in further detail below with regards to FIG. 3.

Figure 2:
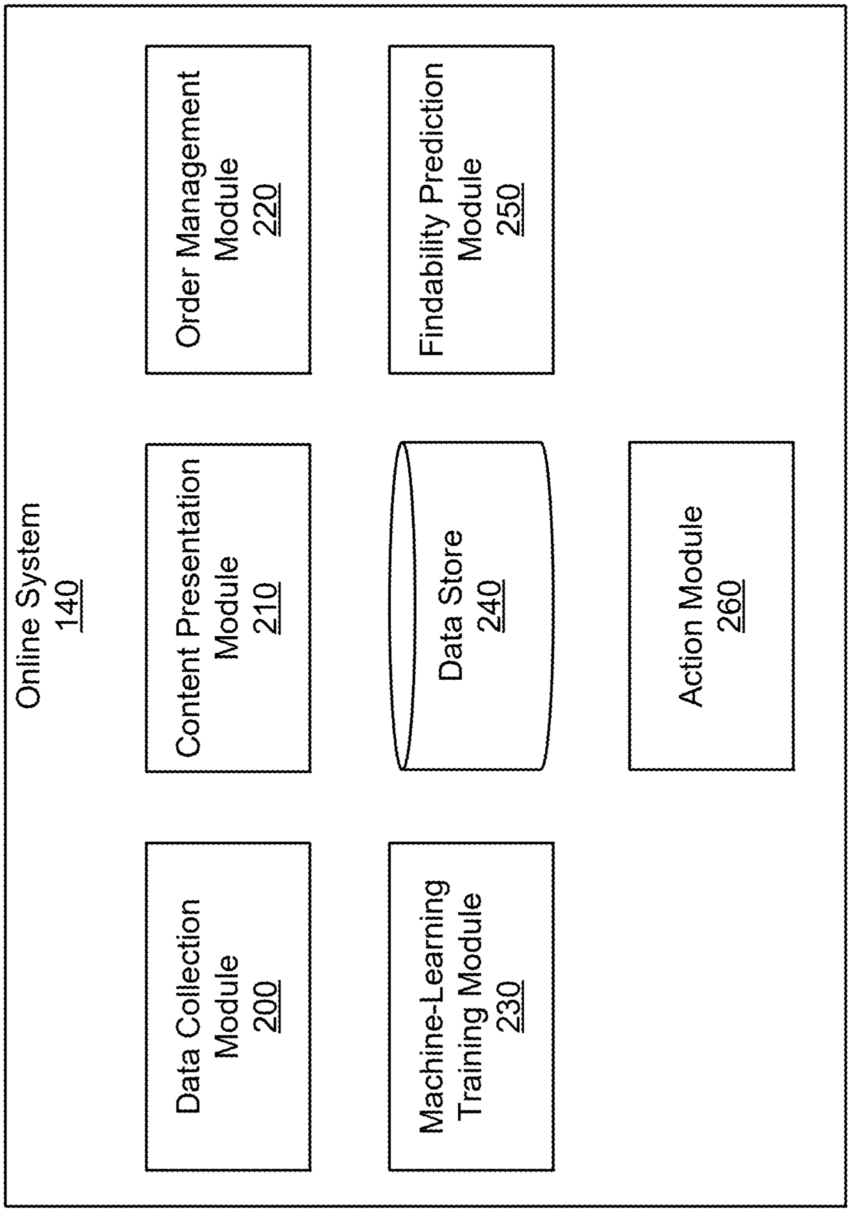
FIG. 2 illustrates an example system architecture for an online system, in accordance with one or more embodiments.

FIG. 2 illustrates an example system architecture for the online system 140, in accordance with some embodiments. The system architecture illustrated in FIG. 2 includes a data collection module 200, a content presentation module 210, an order management module 220, a machine-learning training module 230, a data store 240, a findability prediction module 250, and an action module 260. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from the source computing system 120, the picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The findability prediction module 250 may access a findability prediction model (e.g., machine-learning model) that is trained to predict how easy (or hard) it is to find an item in a specific source location or across multiple locations of a source associated with the online system 140. The findability prediction module 250 may deploy the findability prediction model to run a machine-learning algorithm to output, based on a set of inputs, a findability score for an item for a given source location or a set of source locations. The findability score may be a value (e.g., between 0 and 1) that is indicative of how easy it is to find the item in the source location or in the set of source locations. The higher the findability score is, the easier it may be to find the item; and the lower the findability score is, the harder it may be to find the item. A set of parameters for the findability prediction model may be stored at one or more non-transitory computer-readable media of the findability prediction module 250. Alternatively, the set of parameters for the findability prediction model may be stored at one or more non-transitory computer-readable media of the data store 240.

The findability prediction module 250 may provide the set of inputs representing various input features to the findability prediction model. In providing the set of inputs to the findability prediction model, the findability prediction module 250 may provide picker signals, store signals, item signals, imagery obtained via smart shopping carts 150, information about items extracted from the smart shopping carts 150 (which provides ground truth inventory data), found rates for a set of items, some other data suitable for determining findability of items, or some combination thereof. The various inputs for the findability prediction model may be received at the online system 140, via the network 130, from the user client device 100, the picker client device 110, the source computing system 120, and/or the smart shopping cart 150.

Figure 3:
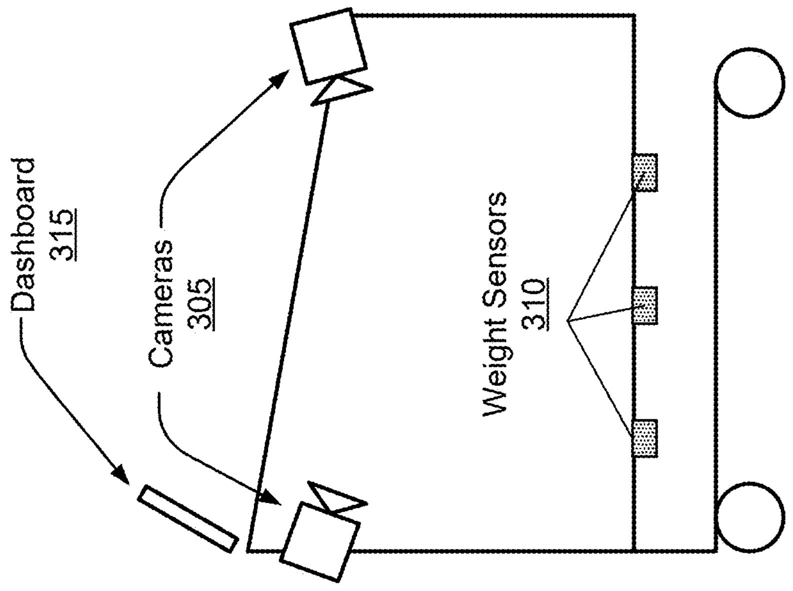
FIG. 3 illustrates an example smart shopping cart associated with an online system, in accordance with one or more embodiments.

FIG. 3 illustrates an example smart shopping cart 150 associated with the online system 140, in accordance with one or more embodiments. The smart shopping cart 150 may have one or more cameras 305 that collect video data and/or image data in relation to shelfs (i.e., store aisles) with various stored items as a user that utilizes the smart shopping cart 150 for in-store shopping is passing by. The one or more cameras 305 may further collect video data and/or image data in relation to items placed in the smart shopping cart 150, such as a weight of each item as indicated in an item label, a brand of each item, a name of each item, a price of each item, etc. Additionally, the one or more cameras 305 may collect video data and/or image data in relation to actions in and around the smart shopping cart 150, such as a location of the smart shopping cart 150 in a source location (e.g., store) when a certain action occurs (e.g., when an item is added to the cart), user's or picker's gestures when placing items in the smart shopping cart 150, video and/or images of user's or picker's interactions with the smart shopping cart 150, track the location of the user or the picker within the source location, measure a velocity of the smart shopping cart 150 in the store, etc. Alternatively or additionally, the smart shopping cart 150 may be equipped with one or more weight sensors 310 that measure weights of items placed in the smart shopping cart 150.

The smart shopping cart 150 may further include a dashboard 315 that operates as a user interface that displays a list of items added to a receptacle of the smart shopping cart 150 and can be used for the checkout. The dashboard 315 may be further used for providing notifications to the user or the picker that utilizes the smart shopping cart 150 for in-store shopping. The smart shopping cart 150 may include additional sensors not shown in FIG. 3. The dashboard 315 or some other component of the smart shopping cart 150 may further include a computing system that is in communication with the user client device 100, the picker client device 110, the source computing system 120 and/or the online system 140 via the network 130.

Data gathered by various sensors of the smart shopping cart 150 may be uploaded via the network 130 at the online system 140 (e.g., via the findability prediction module 250) to be used as input features for the findability prediction model, such as image data related to various items in the source location. For example, the cameras 305 of the smart shopping cart 150 may be continually taking images while a picker or a user is shopping and through photo recognition can isolate where certain items are in the source location. Even if the picker or the user is not currently purchasing a hard-to-find item, cameras 305 mounted at the smart shopping carts 150 would be able to locate the item (if it is in the source location) after a number of pickers or users had traversed the whole source location. Additionally or alternatively, the online system 140 may obtain the extra confirmation of the location of the hard-to-find item from the smart shopping cart 150 based on the location of the smart shopping cart 150 in the source when the hard-to-find item was inserted into the smart shopping cart 150.

In one or more embodiments, the initial data set input into the findability prediction model can be based on a found rate of an item (e.g., historical found rate for the item at a given source location retrieved from the data store 240) combined with information obtained from the source (e.g., from the source computing system 120) about an inventory level of physical stock of the item. For example, if the source knows for sure that the inventory level of physical stock of the item is high, but several pickers indicate via an application of the online system 140 running on picker client devices 110 that they cannot find the item, then the findability prediction model would decrease the findability score of the item.

Note that certain items may be harder to find in certain source locations than in other source locations. Not all locations from the same source are laid out the same. Based on a predicted findability score for an item for a specific location of the source, the online system 140 may offer insights to the source on whether they want to re-arrange their layout or change the location of the item in the source location to make the item easier to find. Hence, a source location signal with information about a layout of a particular source location may be used as an input to the findability prediction model in conjunction with the item signal for generating a findability score for the item for the particular source location.

In providing the picker signals to the findability prediction model, the findability prediction module 250 may provide data with information about which items are unavailable and cannot be found in a source location. For example, one picker signal may be generated when a picker marks an item as unpurchasable and they instead look for a replacement (or refund the item); and another picker signal may be generated when a picker finds the item in a source location. The picker signals received at the online system 140 from picker client devices 110 via the network 130 may be aggregated over a day or some other time period and then fed into the findability prediction model via the findability prediction module 250. For example, if, in aggregate, pickers are finding the item throughout the day but at a low rate (e.g., if only 10% of pickers are locating the item), the findability prediction model can use this information to deduce that the item is really in stock but hard to find. The picker signals may be also combined with inventory signals obtained from, e.g., source's transaction logs (TLOGs) and used as inputs to the findability prediction model. For example, if pickers marked certain items as unfindable and yet it can be identified from the source's TLOGs that the item was able to be purchased all day by other in-store customers, this information can be used by the findability prediction model to decrease a findability score for the item.

In one or more embodiments, data from a user's in-store list of an application of the online system 140 running on the user client device 100 can be also fed as an input feature to the findability prediction model. For example, users of the online system 140 who are using the in-store list may often have an item on their in-store list that they do not end up purchasing. This particular information may be indicative that a user could not find this particular item in a source location (e.g., store) they are visiting. When a user is using the in-store list in real time, the online system 140 may obtain data from the user client device 100 via the network 130 with information about "item find time", which can be used as an input to the findability prediction model. An increased "item find time" would lower a findability score for the item. Additionally or alternatively, the data obtained from in-store lists may be reconciled with source's TLOGs. For example, if a user marks an item as unfindable in their in-store list and yet it can be identified from the source's TLOGs that the item was able to be purchased all day by other in-store users, this information can be used by the findability prediction model to decrease a findability score for the item.

High pick times for a certain item obtained via the network 130 from picker client devices 110 can also be insightful into whether an item is hard to find and can be used as an input to the findability prediction model. However, data with information about pick times for an item may need to be correlated with a type of the item, as high pick times do not necessarily mean that the item is hard to find. For example, if an item is a deli meat, the picker may have to wait in line for a butcher to be able to get the deli meat which increases the pick time, but it does not correlate to the findability of this item.

In one or more embodiments, certain item features can be used as input features for the findability prediction model. Specifically, if an item was gluten-free or vegan, this type of item may be harder to find because they are occasionally stored with the bread and other similar items, but at other times they are in the "health" section of a source location. For example, the conjunction of layout information for a current source location and the facet of vegan may be used as inputs to the findability prediction model to decrease a findability score for a new vegan item if it is known that a basket of vegan items is hard to find at a specific source location that has a similar layout as the current source location.

In one or more embodiments, data with information about an item's likelihood to be promoted into consumer-packaged goods (CPGs) status and placed on endcaps can be used as an input to the findability prediction model. The item's likelihood for CPG promotion may be based on the percentage of time the item spends on end caps or some other correlated metric (e.g., how "holiday" related the item is). Items placed on endcaps are typically in non-obvious places in the source location and can be hard to find. For example, promoted Mexican salsa for the Superbowl may have been moved from the international aisle and would be hard to find.

The machine-learning training module 230 may perform initial training of the findability prediction model using training data. The machine-learning training module 230 may generate the training data by labeling initial findability scores for a set of items. For example, a label for an item may be a likelihood of finding the item when the item is in stock. Alternatively or additionally, the machine-learning training module 230 may generate the training data based on heuristics, such as whether an item is marked as out-of-stock by a picker, but later found within a threshold time (so it was really in stock), picking time, etc. The machine-learning training module 230 may train the findability prediction model using the training data to generate initial values for the set of parameters of the findability prediction model.

The action module 260 may trigger one or more actions based on a findability score for an item predicted by the findability prediction model. In one or more embodiments, during fulfillment, the action module 260 may add, based on the findability score for the item, a friction to a picker associated with the online system 140 who is trying to mark the item as out-of-stock when the item had a low findability score. For example, the action module 260 may generate an incentive for the picker to look harder for the item, either in terms of a bonus or providing extra time for a batch of orders given that the item is hard to find. Additionally, if the online system 140 had garnered imagery from smart shopping carts 150 that had identified where the item was in the source location, the action module 260 may provide an aisle number and imagery of where the item was in the source location on a user interface of the picker client device 110. The action module 260 may generate a prompt for display at the user interface of the picker client device 110, such as "Have you checked Aisle 14, Middle Row?" Additionally or alternatively, based on a low findability score for an item, the action module 260 may surface an order with that hard-to-find item only to those pickers who are excellent at finding hard-to-find items. For example, the action module 260 may utilize ranking scores for a collection of pickers (e.g., as available at the data store 240) that ranks pickers based on their ability to successfully complete batches from stores containing specific items to identify a subset of pickers who are excellent at finding hard-to-find items.

In one or more embodiments, the action module 260 generate insight signals for a source associated with the online system 140 that are communicated to the source computing system 120 via the network 130. In providing the insight signals to the source, the action module 260 may provide findability scores for a collection of items, or a list of items that are outliers in findability (e.g., items that are especially hard to find and have lowest findability scores). Additionally or alternatively, in providing the insight signals to the source, the action module 260 may communicate a report with suggestion for the source to re-arrange their source location to improve found rates for the hard-to-find items. For example, the action module 260 may communicate the report with a suggestion for the source to get rid of the "Health" food section that houses the vegan and gluten-free items that are hard to find, and instead place the vegan and gluten-free items next to similar typed items (e.g., vegan butter placed next to the butter). In addition to suggesting re-arrangement to the source location, the action module 260 may communicate insight signals with information about order rates for certain hard-to-find items so that the source can make a financially sound decision when deciding to re-arrange the source location. Additionally, the action module 260 may communicate information to the source about extremely low found rates on specific items based on an average found rate for the source and their industry peers.

In one or more embodiments, the action module 260 generates, based on findability scores for a collection of items, a marketplace report of hard-to-find items that is communicated to the source computing system 120 via the network 130. For example, some sources may want to take advantage of marketplace reports of hard-to-find items to purvey these if an item is commonly ordered but commonly not found. This marketplace report may provide a lift to the source location if the source stocks the item.

In one or more embodiments, the action module 260 queries a picker associated with the online system 140 as to which aisles in a source location they looked for an item. Then, the action module 260 may communicate the insight signals to the source computing system 120 via the network 130 with information on where the picker (or general public) expected to find the item and where the source may want to re-arrange the item to.

In one or more embodiments, the action module 260 triggers, based on findability scores for a collection of items, certain actions for batching improvements. For example, certain hard-to-find items may be more easily available to find at certain times of day. For those online users who choose a flexible delivery window, the action module 260 may batch those online orders when a majority of the hard-to-find items are likely in stock. If a minority of the hard-to-find items are in stock within the selected delivery window of an online user, the action module 260 may prompt the user to change their delivery window to a time more suitable for finding hard-to-find items in stock (and potentially integrate with times when CPG partners deliver their items). Alternatively, the action module 260 may automatically make this adjustment in relation to the delivery window.

Additionally or alternatively, if the findability prediction model identifies that certain CPG item(s) are hard to find, the action module 260 may generate an offer for a CPG partner to sponsor an end cap with their CPG items. Additionally or alternatively, based on findability scores for a collection of items, the action module 260 may generate a comparison score of a CPG partner relative to their top competitors and show how much worse the CPG partner is performing compared to the top competitors in terms of how easy their items are to find.

In one or more embodiments, the action module 260 triggers, based on findability scores for a collection of items, certain actions for improving user efficiency. For example, if the online system 140 has information (e.g., as received from the source computing system 120 via the network 130) about when hard-to-find items were being re-supplied to the source, the action module 260 may utilize this information to prompt a user on a user interface of the user client device 100 to delay an order to increase the chance that they would be able to get their requested hard-to-find item. Additionally or alternatively, the action module 260 may rank items for displaying at the user interface of the user client device 100 based at least in part on their findability scores. For example, the action module 260 may de-prioritize hard-to-find items when search results are being displayed at the user interface of the user client device 100, i.e., the hard-to-find items may be re-arranged at the user interface of the user client device 100 such that the hard-to-find items are listed at the user interface at the very end of a list of search results.

The machine-learning training module 230 may collect feedback data with information about effects of the one or more aforementioned actions that were triggered by the action module 260 based on findability scores for a set of items. For example, if the source re-arranged a source location layout to make certain items easier to find and found rates of these items increase, this information may be provided as the feedback data to the findability prediction model. Additionally or alternatively, if certain incentives provided to pickers to look harder for certain items pay off as found rates of these items increase, this information may be also provided as the feedback data to the findability prediction model. The machine-learning training module 230 may then re-train the findability prediction model by updating the set of parameters of the findability prediction model using the collected feedback data.

Figure 4:
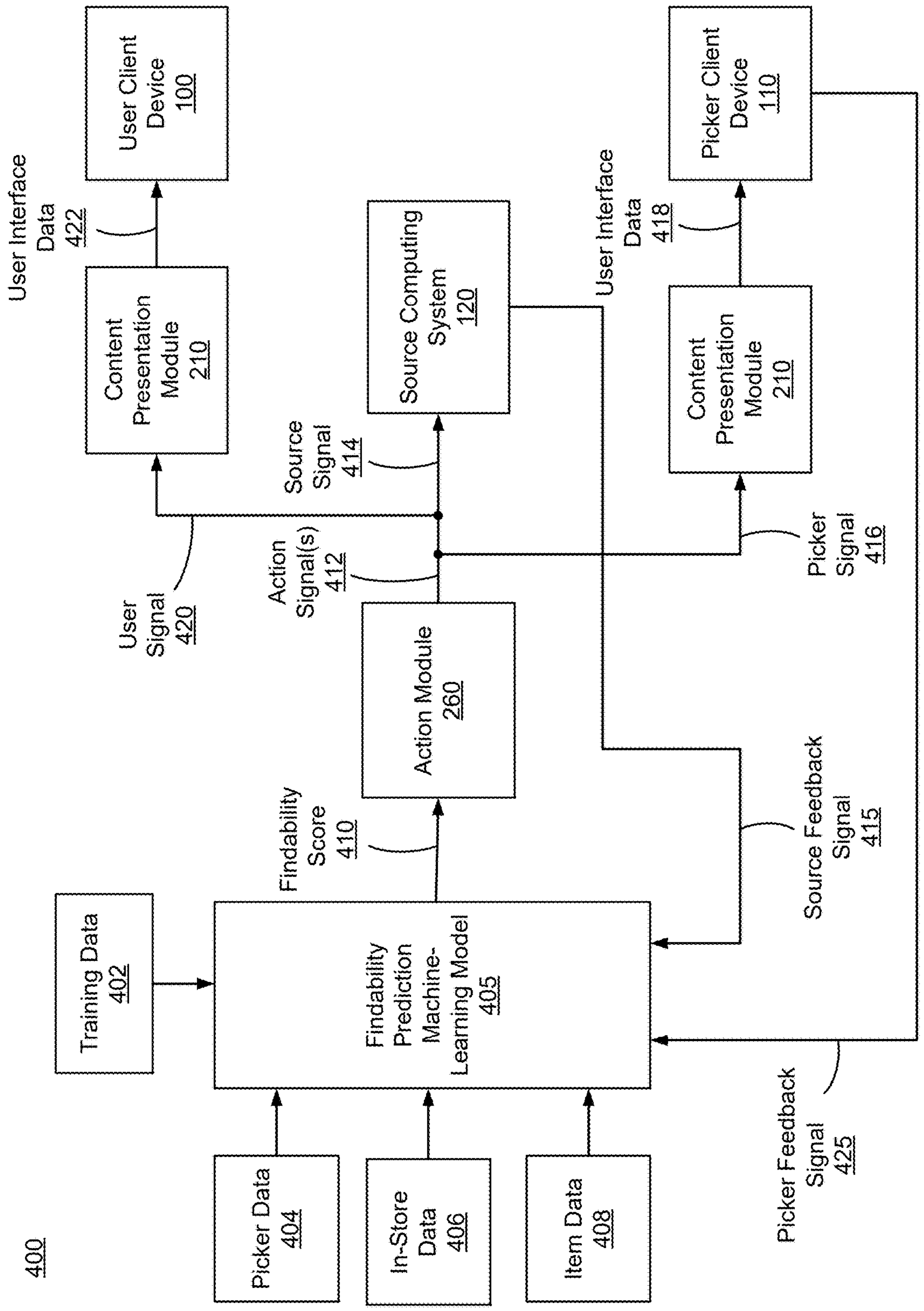
FIG. 4 illustrates an example architectural flow diagram of using a trained machine-learning model of an online system to facilitate picking items in a source location (e.g., warehouse), in accordance with one or more embodiments.

FIG. 4 illustrates an example architectural flow diagram 400 of using a findability prediction machine-learning model 405 of the online system 140 to facilitate picking of items in a source location, in accordance with one or more embodiments. First, the online system 140 may perform (e.g., via the machine-learning training module 230) initial training of the findability prediction machine-learning model 405 using training data 402 to generate initial values for the set of parameters of the findability prediction machine-learning model 405. The training data 402 may be generated (e.g., via the machine-learning training module 230) by labeling initial findability scores for a collection of items based on a likelihood of finding each item from the collection of items in a source location (e.g., as predicted by the availability machine-learning model) when the item is in stock and/or based on heuristics, such as whether an item is marked as out-of-stock by a picker, but later found in a source location within a threshold time (so the item was really in stock), picking time, etc. After the training process is completed, the online system 140 may provide various inputs to the findability prediction machine-learning model 405 (e.g., via the findability prediction module 250), such as picker data 404, in-store data 406, and/or item data 408. Some additional input features not shown in FIG. 4 suitable for predicting a findability of an item may be further provided to the findability prediction machine-learning model 405.

In providing the picker data 404 to the findability prediction machine-learning model 405, the online system 140 may provide (e.g., via the findability prediction module 250) data with information about which items are unavailable and cannot be found in a source location (e.g., generated when a picker marks an item as unpurchasable and they instead look for a replacement or refund), data with information which items are available and can be found in the source location (e.g., generated when a picker finds an item in the source location), some other picker-related data, or some combination thereof. The picker data 404 may be received at the online system 140 (e.g., at the findability prediction module 250 or some other module of the online system 140) from picker client devices 110 via the network 130 and aggregated over a time period (e.g., 24 hours) before being fed into the findability prediction machine-learning model 405.

In providing the in-store data 406 to the findability prediction machine-learning model 405, the online system 140 may provide (e.g., via the findability prediction module 250) one or more images of an item, video data associated with the item, information about a location of an item in a source location (e.g., store), data from a user's in-store list of an application of the online system 140 running on the user client device 100, some other in-store data related to the item, or some combination thereof. The in-store data 406 may be received at the online system 140 (e.g., at the findability prediction module 250 or some other module of the online system 140) from the smart shopping cart 150 and/or the user client device 100 via the network 130.

In providing the item data 408 to the findability prediction machine-learning model 405, the online system 140 may provide (e.g., via the findability prediction module 250) information about a found rate for an item (e.g., as available at the data store 240), information about inventory of the item in a source location, an average picking time for the item, a type of the item, some other item-related data, or some combination thereof. The item data 408 may be received at the online system 140 (e.g., at the findability prediction module 250 or some other module of the online system 140) from picker client devices 110 and/or the source computing system via the network 130 and stored at, e.g., the data store 240 before being fed into the findability prediction machine-learning model 405.

The findability prediction machine-learning model 405 may apply a machine-learning algorithm to the picker data 404, the in-store data 406, and/or the item data 408 to output a findability score 410 for the item, where the findability score 410 is indicative of a findability of the item in a specific source location or across different source locations. The findability score 410 may be a value (e.g., between 0 and 1) that is indicative of how easy is to find the item at the specific source location or across different source locations. The higher the findability score 410 is, the easier may be to find the item; and the lower the findability score is, the harder may be to find the item. The findability score 410 output by the findability prediction machine-learning model 405 may be passed to the action module 260.

The action module 260 may generate, based on the findability score 410, one or more action signals 412 that may trigger one or more actions to improve findability of the item and facilitate picking the item in the source location. The action module 260 may communicate the one or more action signals 412 as a source signal 414 to the source computing system 120 (e.g., via the network 130), as a picker signal 416 to the content presentation module 210 interfaced (e.g., via the network 130) to the picker client device 110, and/or as a user signal 420 to the content presentation module 210 interfaced (e.g., via the network 130) to the user client device 100.

In providing the source signal 414 to the source computing system 120, the action module 260 may provide a report with a suggestion for the source to re-arrange a floorplan of their source location to improve a found rate for the item. Additionally, if the source re-arranged the source location based on the source signal 414, an updated found rate of the item may be recorded as a source feedback signal 415 that is fed back to the findability prediction machine-learning model 405. The online system 140 may receive (e.g., via the machine-learning training module 230) the source feedback signal 415 from the source computing system 120 via the network 130. The machine-learning training module 230 may utilize the source feedback signal 415 to re-train the findability prediction machine-learning model 405. By utilizing the source feedback signal 415, the machine-learning training module 230 may update the set of parameters of the findability prediction machine-learning model 405 and continuously improve the machine-learning algorithm of the findability prediction machine-learning model 405.

In providing the picker signal 416 to the content presentation module 210 interfaced to the picker client device 110, the action module 260 may provide a message for a picker for prompting the picker to continue searching for the item in a source location. In such cases, the content presentation module 210 may use the picker signal 416 to generate user interface data 418 causing a user interface of the picker client device 110 to display the message with, e.g., an incentive for the picker to continue searching for the hard-to-find item in the source location. Alternatively, the action module 260 may select, based on the findability score, a set of pickers from a collection of pickers associated with the online system 140 for fulfillment of an order placed at the online system 140 with a request for the hard-to-find item. In such cases, the content presentation module 210 may generate, based on the picker signal 416, a corresponding user interface data 418 causing a user interface of the picker client device to display information about the order so that the selected picker can accept an offer for fulfillment of the order.

Additionally, information from the picker about whether they were able to find the hard-to-find item may be recorded as a picker feedback signal 425 at the picker client device 110 and fed back from the picker client device 110 to the findability prediction machine-learning model 405 via the network 130. The online system 140 may receive (e.g., via the machine-learning training module 230) the picker feedback signal 425 from the picker client device 110 via the network 130. The machine-learning training module 230 may utilize the picker feedback signal 425 to re-train the findability prediction machine-learning model 405. By utilizing the picker feedback signal 425, the machine-learning training module 230 may update the set of parameters of the findability prediction machine-learning model 405 and continuously improve the machine-learning algorithm of the findability prediction machine-learning model 405.

In providing the user signal 420 to the content presentation module 210 interfaced to the user client device 100, the action module 260 may provide information about a list of items including the hard-to-find item, where the ranked list of items may be generated by the action module 260 based at least in part on the findability score for the hard-to-find item. Based on the user signal 420, the content presentation module 210 may generate a user interface data 422 with information about items from the ranked list of items. The content presentation module 210 may then cause the user client device 100 to display a user interface including a plurality of icons arranged in accordance with the ranking, where each of the plurality of icons may be associated with a respective item from the ranked list of items. For example, if the findability score for the item is low (i.e., the item is hard to find), icons for the items would be listed at the user interface of the user client device 100 such that the item would not be prominently displayed (e.g., the user would need to scroll through the user interface of the user client device 100 to view an icon of the hard-to-find item to engage with the hard-to-find item).

Figure 5:
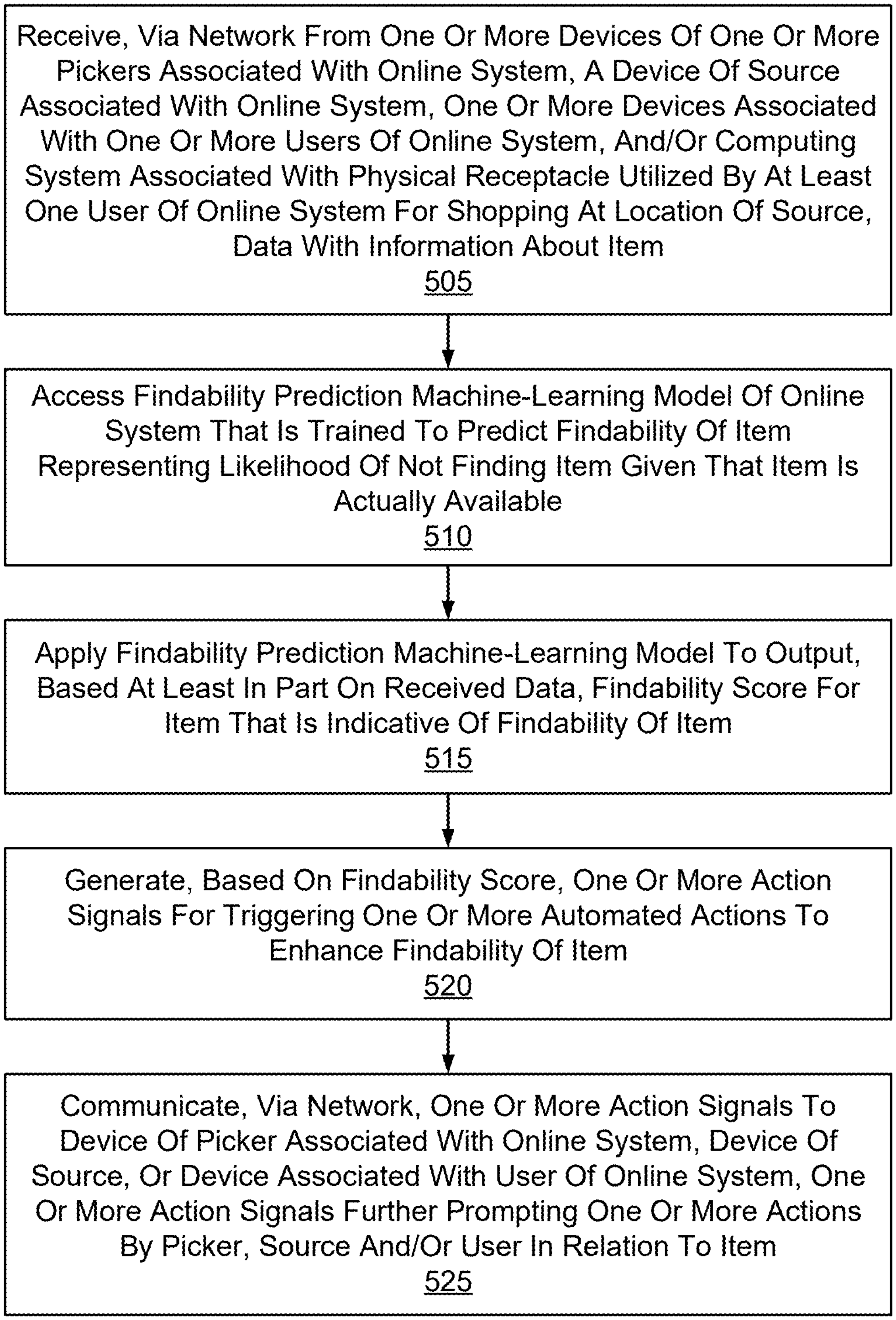
FIG. 5 is a flowchart for a method of using a trained machine-learning model of an online system to facilitate picking items in a source location, in accordance with one or more embodiments.

FIG. 5 is a flowchart for a method of using a trained machine-learning model of an online system to facilitate picking items in a source location, in accordance with one or more embodiments. Alternative embodiments may include more, fewer, or different steps from those illustrated in FIG. 5, and the steps may be performed in a different order from that illustrated in FIG. 5. These steps may be performed by an online system (e.g., the online system 140). Additionally, each of these steps may be performed automatically by the online system without human intervention.

The online system 140 receives 505 (e.g., via the findability prediction module 250), via a network (e.g., the network 130) from at least one of one or more devices of one or more pickers associated with the online system 140 (e.g., one or more picker client devices 110), a device of a source associated with the online system 140 (e.g., the source computing system 120), one or more devices associated with one or more users of the online system 140 (e.g., one or more user client devices 100), or a computing system associated with a physical receptacle (e.g., the smart shopping cart 150) utilized by at least one user of the online system 140 for shopping in a source location, data with information about an item.

The online system 140 may receive (e.g., via the findability prediction module 250), from the one or more devices of the one or more pickers via the network, the data including one or more picker signals indicating that the item cannot be found in a location of the source. Alternatively or additionally, the online system 140 may receive (e.g., via the findability prediction module 250), from the device of the source via the network, the data including one or more source signals with information about at least one of inventory of the item in a location of the source or transactions associated with the item in the location of the source over a defined time period (e.g., last 24 hours).

Alternatively or additionally, the online system 140 may gather, via one or more sensors (e.g., the one or more cameras 305 and/or the weight sensors 310) mounted to the physical receptacle, at least one of scanning data with information about the item, one or more images of the item, or video data associated with the item. The online system 140 may then receive (e.g., via the findability prediction module 250), from the computing system associated with the physical receptacle via the network, the data including at least one of the scanning data, the one or more images, or the video data.

Alternatively or additionally, the online system 140 may receive (e.g., via the findability prediction module 250), via the network from at least one of the one or more devices of the one or more pickers or the one or more devices associated with the one or more users, one or more item signals with information about whether the item was found by the one or more pickers or the one or more users. Alternatively or additionally, the online system 140 may receive (e.g., via the findability prediction module 250), via the network from the one or more devices associated with the one or more users, one or more item signals with information about one or more in-store lists of an application of the online system 140 running on the one or more devices associated with the one or more users. The online system 140 may then generate (e.g., via the findability prediction module 250), based on the one or more item signals, the data including information about a found rate for the item.

The online system 140 accesses 510 a findability prediction machine-learning model of the online system 140 (e.g., via the findability prediction module 250), wherein the findability prediction machine-learning model is trained to predict a findability of the item representing a likelihood of not finding the item given that the item is actually available. The online system 140 applies 515 the findability prediction machine-learning model (e.g., via the findability prediction module 250) to output, based at least in part on the received data, a findability score for the item that is indicative of the findability of the item.

The online system 140 generates 520 (e.g., via the action module 260), based on the findability score, one or more action signals for triggering one or more automated actions to enhance the findability of the item. The online system 140 communicates 525 (e.g., via the action module 260), via the network, the one or more action signals to at least one of a device of a picker associated with the online system 140 (e.g., the picker client device 110), the device of the source, or a device associated with a user of the online system 140 (e.g., the user client device 100), the one or more action signals further prompting one or more actions by at least one of the picker, the source, or the user in relation to the item.

The online system 140 may communicate (e.g., via the action module 260), to the device associated with the source via the network, a source signal prompting the source to re-arrange a floorplan of a location of the source in relation to the item. Alternatively, the online system 140 may generate (e.g., via the action module 260), based on the findability score, a message for a picker associated with the online system 140 for prompting the picker to continue searching for the item in a location of the source. The online system 140 may then cause (e.g., via the content presentation module 210) a device of the picker (e.g., the picker client device 110) to display a user interface with the message prompting the picker to continue searching for the item in the location of the source.

Alternatively or additionally, the online system 140 may select (e.g., via the action module 260), based on the findability score, a set of pickers from a collection of pickers associated with the online system 140 for fulfillment of an order placed at the online system 140 that includes a request for the item. The online system 140 may then cause (e.g., via the content presentation module 210) a set of devices of the set of pickers (e.g., set of picker client devices 110) to display a set of user interfaces with information about the order so that at least one of the selected pickers can accept a fulfillment of the order.

Alternatively or additionally, the online system 140 may rank (e.g., via the action module 260), based at least in part on the findability score, a list of items including the item to generate a ranked list of items. The online system 140 may then generate (e.g., via the action module 260) a user interface of a device associated with a user of the online system 140 (e.g., the user client device 100) that includes information about items from the ranked list. Finally, the online system 140 may cause (e.g., via the content presentation module 210) the device associated with the user to display the user interface including a plurality of icons arranged in accordance with the ranking, each of the plurality of icons associated with a respective item from the ranked list.

Alternatively or additionally, the online system 140 may generate (e.g., via the action module 260), based on the findability score, a message for a user of the online system 140. The online system 140 may then cause (e.g., via the content presentation module 210) a device associated with the user (e.g., the user client device 100) to display a user interface with the message prompting the user to reschedule an order placed at the online system 140 that includes a request for the item.

The online system 140 may generate (e.g., via the machine-learning training module 230) training data by assigning labels to a set of items based on a likelihood of finding each item from the set of items in one or more locations of the source when each item from the set is available in the one or more locations of the source. The online system 140 may train (e.g., via the machine-learning training module 230), using the training data, the findability prediction machine-learning model to generate a set of initial values for the set of parameters of the findability prediction machine-learning model.

The online system 140 may collect (e.g., via the machine-learning training module 230) feedback data with information about one or more effects of the one or more actions conducted by at least one of the picker, the source, or the user in relation to the item. The online system 140 may re-train the findability prediction machine-learning model by updating (e.g., via the machine-learning training module 230), using the collected feedback data, the set of parameters of the findability prediction machine-learning model.

Embodiments of the present disclosure are directed to the online system 140 that utilizes a trained machine-learning model to predict findability of items, and then use the predicted findability scores for order fulfillment. The online system 140 presented herein integrates the trained machine-learning model that applies a unique approach to identify the most difficult-to-find items, provide the source insights on these hard-to-find items, and also attempts to improve the found rate of these hard-to-find items.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:

collecting, via a sensor-computing system installed on a moveable cart in a location of a source, source data including images and videos of a set of places in the location of the source;

uploading, via a network and from the sensor-computing system, the collected source data;

receiving, via the network and from at least one of one or more devices associated with one or more pickers, a device associated with the source, one or more devices associated with one or more users of the computer system, or a computing system associated with a physical receptacle utilized in the location of the source, data with information about an item including an indication that the item cannot be found in the location of the source;

obtaining, from the collected source data and responsive to the indication, a source signal representing an inventory evidence about the item in relation to the location of the source;

accessing a findability prediction model of the computer system, wherein the findability prediction model is a machine-learning model trained to predict a findability of the item in the location of the source representing a likelihood of not finding the item given that the item is actually available in the location of the source;

applying the findability prediction model to the received data and the source signal to generate a findability score for the item that is indicative of the findability of the item;

generating, using the findability score, one or more action signals for triggering one or more automated actions to enhance the findability of the item; and communicating, via the network, the one or more action signals to at least one of a device associated with a picker in the location of the source, the device associated with the source, or a device associated with a user of the computer system, the one or more action signals further prompting one or more actions by at least one of the picker, the source, or the user in relation to the item.

2. The method of claim 1, wherein receiving the data comprises:

receiving, from the one or more devices associated with the one or more pickers and via the network, the data including one or more picker signals indicating that the item cannot be found in the location of the source.

3. The method of claim 1, wherein receiving the data comprises:

receiving, from the device associated with the source and via the network, the data including one or more source signals with information about at least one of an inventory of the item in the location of the source or transactions associated with the item in the location of the source over a defined time period.

4. The method of claim 1, wherein receiving the data comprises:

gathering, via one or more sensors mounted to the physical receptacle, at least one of scanning data with information about the item, one or more images of the item, or video data associated with the item; and receiving, from the computing system associated with the physical receptacle and via the network, the data including at least one of the scanning data, the one or more images, or the video data.

5. The method of claim 1, wherein receiving the data comprises:

receiving, via the network and from at least one of the one or more devices associated with the one or more pickers or the one or more devices associated with the one or more users, one or more item signals with information about whether the item was found by the one or more pickers or the one or more users; and generating, using the one or more item signals, the data including information about a found rate for the item.

6. The method of claim 1, wherein receiving the data comprises:

receiving, via the network and from the one or more devices associated with the one or more users, one or more item signals with information about one or more in-store lists of an application of the computer system running on the one or more devices associated with the one or more users; and generating, using the one or more item signals, the data including information about a found rate for the item.

7. The method of claim 1, wherein communicating the one or more action signals comprises:

communicating, to the device associated with the source and via the network, a source signal prompting the source to re-arrange a floorplan of the location of the source in relation to the item.

8. The method of claim 1, wherein:

generating the one or more action signals comprises generating, using the findability score, a message for a picker for prompting the picker to continue searching for the item in the location of the source; and communicating the one or more action signals comprises causing a device associated with the picker to display a user interface with the message prompting the picker to continue searching for the item in the location of the source.

9. The method of claim 1, wherein:

generating the one or more action signals comprises selecting, using the findability score, a set of pickers from a collection of pickers for fulfillment of an order placed at the computer system that includes a request for the item; and communicating the one or more action signals comprises causing a set of devices associated with the set of pickers to display a set of user interfaces with information about the order.

10. The method of claim 1, wherein:

generating the one or more action signals comprises:

ranking, using the findability score, a list of items including the item to generate a ranked list of items, and generating a user interface of a device associated with a user of the computer system that includes information about items from the ranked list of items; and communicating the one or more action signals comprises causing the device associated with the user to display the user interface including a plurality of icons arranged in accordance with the ranking, each of the plurality of icons associated with a respective item from the ranked list of items.

11. The method of claim 1, wherein:

generating the one or more action signals comprises generating, using the findability score, a message for a user of the computer system; and communicating the one or more action signals comprises causing a device associated with the user to display a user interface with the message prompting the user to reschedule an order placed at the computer system that includes a request for the item.

12. The method of claim 1, further comprising:

generating training data by assigning labels to a set of items using a likelihood of finding each item from the set of items at one or more locations of the source, when each item from the set of items is available at the one or more locations of the source; and training, using the training data, the findability prediction model to generate a set of initial values for a set of parameters of the findability prediction model.

13. The method of claim 1, further comprising:

collecting feedback data with information about one or more effects of the one or more actions conducted by at least one of the picker, the source, or the user in relation to the item; and re-training the findability prediction model by updating, using the collected feedback data, a set of parameters of the findability prediction model.

14. A computer program product comprising a non-transitory computer readable storage medium having instructions encoded thereon that, when executed by a processor, cause the processor to perform steps comprising:

collecting, via a sensor-computing system installed on a moveable cart in a location of a source, source data including images and videos of a set of places in the location of the source;

uploading, via a network and from the sensor-computing system, the collected source data;

receiving, via the network and from at least one of one or more devices associated with one or more pickers, a device a associated with the source, one or more devices associated with one or more users of a computer system, or a computing system associated with a physical receptacle utilized in the location of the source, data with information about an item including an indication that the item cannot be found in the location of the source;

obtaining, from the collected source data and responsive to the indication, a source signal representing an inventory evidence about the item in relation to the location of the source;

accessing a findability prediction model of the computer system, wherein the findability prediction model is a machine-learning model trained to predict a findability of the item in the location of the source representing a likelihood of not finding the item given that the item is actually available in the location of the source;

applying the findability prediction model to the received data and the source signal to generate a findability score for the item that is indicative of the findability of the item;

generating, using the findability score, one or more action signals for triggering one or more automated actions to enhance the findability of the item; and communicating, via the network, the one or more action signals to at least one of a device associated with a picker in the location of the source, the device associated with the source, or a device associated with a user of the computer system, the one or more action signals further prompting one or more actions by at least one of the picker, the source, or the user in relation to the item.

15. The computer program product of claim 14, wherein the instructions further cause the processor to perform steps comprising at least one of:

receiving, from the one or more devices associated with the one or more pickers and via the network, the data including one or more picker signals indicating that the item cannot be found in the location of the source; and receiving, from the device associated with the source and via the network, the data including one or more source signals with information about at least one of an inventory of the item in the location of the source or transactions associated with the item in the location of the source over a defined time period.

16. The computer program product of claim 14, wherein the instructions further cause the processor to perform steps comprising:

gathering, via one or more sensors mounted to the physical receptacle, at least one of scanning data with information about the item, one or more images of the item, or video data associated with the item; and receiving, from the computing system associated with the physical receptacle and via the network, the data including at least one of the scanning data, the one or more images, or the video data.

17. The computer program product of claim 14, wherein the instructions further cause the processor to perform steps comprising:

communicating, to the device associated with the source and via the network, a source signal prompting the source to re-arrange a floorplan of the location of the source in relation to the item.

18. The computer program product of claim 14, wherein the instructions further cause the processor to perform steps comprising:

generating, using the findability score, a message for a picker for prompting the picker to continue searching for the item in the location of the source; and causing a device associated with the picker to display a user interface with the message prompting the picker to continue searching for the item in the location of the source.

19. The computer program product of claim 14, wherein the instructions further cause the processor to perform steps comprising:

ranking, using the findability score, a list of items including the item to generate a ranked list of items;

generating a user interface of a device associated with a user of the computer system that includes information about items from the ranked list of items; and causing the device associated with the user to display the user interface including a plurality of icons arranged in accordance with the ranking, each of the plurality of icons associated with a respective item from the ranked list of items.

20. A computer system comprising:

a processor; and a non-transitory computer-readable storage medium having instructions that, when executed by the processor, cause the computer system to perform steps comprising:

collecting, via a sensor-computing system installed on a moveable cart in a location of a source, source data including images and videos of a set of places in the location of the source;

uploading, via a network and from the sensor-computing system, the collected source data;

receiving, via the network and from at least one of one or more devices associated with one or more pickers, a device associated with the source, one or more devices associated with one or more users of the computer system, or a computing system associated with a physical receptacle utilized in the location of the source, data with information about an item including an indication that the item cannot be found in the location of the source;

obtaining, from the collected source data and responsive to the indication, a source signal representing an inventory evidence about the item in relation to the location of the source;

accessing a findability prediction model of the computer system, wherein the findability prediction model is a machine-learning model trained to predict a findability of the item in the location of the source representing a likelihood of not finding the item given that the item is actually available in the location of the source;

applying the findability prediction model to the received data and the source signal to generate a findability score for the item that is indicative of the findability of the item;

generating, using the findability score, one or more action signals for triggering one or more automated actions to enhance the findability of the item; and communicating, via the network, the one or more action signals to at least one of a device associated with a picker in the location of the source, the device associated with the source, or a device associated with a user of the computer system, the one or more action signals further prompting one or more actions by at least one of the picker, the source, or the user in relation to the item.

* * * * *